United States Patent [19]

Tucker

[11] Patent Number: 4,933,110

[45] Date of Patent: Jun. 12, 1990

[54] OPTICAL RADIATION SHIELD FOR PROTECTION FROM MULTIPLE LASERS

[75] Inventor: Robert J. Tucker, Hackettstown, N.J.

[73] Assignee: American Cyanamid Company, Stamford, Conn.

[21] Appl. No.: 290,927

[22] Filed: Dec. 28, 1988

[51] Int. Cl.$^5$ .......................... G02B 5/23; G02B 1/04; F21V 9/00
[52] U.S. Cl. .................................... 252/582; 252/587; 252/588; 252/589; 350/1.1; 350/311
[58] Field of Search ................. 350/1.1, 311; 252/582, 252/587, 588, 589

[56] References Cited

U.S. PATENT DOCUMENTS

| | | | |
|---|---|---|---|
| 3,853,783 | 12/1974 | Tucker ................................. | 252/582 |
| 3,909,442 | 9/1975 | Tucker et al. ........................ | 252/589 |
| 4,622,174 | 11/1986 | McKoy et al. ....................... | 252/582 |

*Primary Examiner*—Jon W. Henry
*Attorney, Agent, or Firm*—Gordon L. Hart

[57] ABSTRACT

Optical light filters, useful for eye protection from laser radiation, are provided. The filter can absorb harmful radiation from lasers of several (at least six (6)) types which have a range of different specific wavelengths, yet permit sufficient visibility. A novel mixture of compatible absorbers in a transparent plastic carrier, having the required stability to withstand processing conditions and having satisfactory stability for use under environmental conditions is disclosed.

5 Claims, No Drawings

OPTICAL RADIATION SHIELD FOR PROTECTION FROM MULTIPLE LASERS

The invention relates to optical light filters for eye protection and more particularly to such filters for protection from laser radiation.

There is a need in laser laboratories and in military applications for means to protect the eyes or radiation sensors or the like from damaging laser radiation. In prior art, goggles, lenses, films, face masks, windows and the like were provided consisting of transparent plastics in which radiation absorbing dyes were dispersed to attenuate the transmission of harmful radiation by absorption while transmitting at least sufficient light in the visible spectrum for visibility to the observer. Most prior art laser radiation shields were designed for narrow band selective absorption at the specific wavelength of a single type of laser, or in some instances at specific wavelengths of two or three lasers.

The invention is directed to improved laser protection devices that can absorb harmful radiation from lasers of several different types which have a range of different specific wavelengths, and yet can permit sufficient visibility. This is accomplished by use of a mixture of compatible absorbers in a transparent plastic carrier, collectively having the required absorption and transmission properties, and having the required stability to withstand processing conditions for making a laser radiation shield, and having satisfactory stability in use under environmental conditions. It is important that the light shield protects entirely by absorption rather than by reflection of radiation. A device embodying the invention can protect equally whether the laser beam comes from side angles or from straight ahead, and the danger to others from reflected laser radiation is diminished.

The novel mixture of radiation-absorbing dyes according to the invention is incorporated in a transparent sheet or film or a lens of transparent plastic to make a laser radiation shield. The mixture of dyes may be incorporated into a melt of the plastic material, as in the case of polycarbonates, and the melt may be cast or molded into sheets, lenses, film and the like. In other embodiments the dyes may be combined with a prepolymer mix which is then cast and hardened to make a sheet, film, lens or the like, as in the case of polymethylmethacrylate. Other transparent, solid polymeric resins may be used as the carrier for the radiation absorbing materials, such as polyvinyl or polyvinylidene halides, homopolymers and copolymers of acrylonitrile and styrene, various acrylic resins, cellulose esters such as cellulose propionate, or the like.

The most preferred resin is polycarbonate. We prefer to use a bisphenol-A polycarbonate having a melt flow index of 16 or greater, as measured by ASTM test method D1238-82 and we prefer such a polycarbonate that is essentially free of acidic or basic residues. Such polycarbonate resins can be melt blended with the absorbers and molded as by extrusion or injection molding at temperatures up to about 500° F. that will not destroy the effectiveness of the absorbers in the short time needed for blending and molding.

U.S. Pat. No. 3,853,783 described laser shields in which a mixture comprising a vanadyl phthalocyanine sulfonamide absorber and an ultraviolet absorber were combined in polymethyl methacrylate to absorb laser radiation in the range of about 610 to 710 nanometers, which includes the specific wavelengths of the ruby laser (694 nm), the krypton laser (671 nm) and the helium-neon laser (633 nm).

U.S. Pat. No. 4,622,174 described laser shields comprising the mixture of an octaethyl porphyrin complex of platinum and a vanadyl phthalocyanine for selective absorption at the ruby laser wavelength (694 nm) as well as the double YAG laser wavelength (532 nm).

One problem with combining a number of different absorbers to shield against several lasers having differing specific wavelengths is that each absorber, when added in quantity sufficient to provide optical density of at least 3 at the specific wavelength, will usually occlude a broader portion of the visible spectrum near the specific wavelength. Thus, each added absorber substantially reduces the luminous transmission of the shield.

An object, therefore, is to find absorbers having absorption at the specific wavelengths to be absorbed and which can minimize the loss of luminous transmission.

A further object is to provide a mixture of compatible absorbers having the required optical density at the laser specific wavelengths, and having sufficient luminous transmission for adequate visibility. For compatibility, the mixture of absorbers must not interact or react one with another, and all must be stable in the selected transparent resin matrix. They must be stable against the processing conditions to be used for making the shield as well as maintaining stability in use.

The invention provides a combination of absorbers in transparent medium for protection against laser radiation from at least six (6) different lasers while maintaining luminous transmission of at least 12% and up to 25% or more, and with sufficient heat stability for processing to make polycarbonate shields and having excellent environmental stability.

According to the invention, we use a combination of four (4) absorbers in a transparent medium. The four absorbers are:

(1) a vanadyl phthalocyanine sulfonamide absorber, such as those described in U.S. Pat. No. 3,853,753;

(2) an ultraviolet absorber having broad band absorption in the ultraviolet band, such as the known U.V. absorbers of the benzophenone, triazine, benzotriazole and oxanilide types of U.V. absorbers;

(3) an absorber having a broad absorption band at the blue to green end of the spectrum, such as Solvent Orange 60 (a perinone) or the dialkylsulfonamide derivatives of 12-H-naphthoperinone such as those described in U.S. Pat. Nos. 3,909,442 and 3,962,245; and (4) a narrow band infrared absorber having maximum absorption near 980 nm, such as tris(p-diethylaminophenyl)aminium hexafluoroantimonate, tris(p-diethylaminophenyl)aminium hexafluoroarsenate, tris(p-dibutylaminophenyl)aminium hexafluoroantimonate and tris(p-dibutylaminophenyl)aminium heraluoroarsenate.

The four absorbers are combined with a transparent carrier in proportions that will provide optical density of at least 2, and preferably at least 3.5, at each of the laser specific wavelengths indicated in Table 1, and yet maintain luminous transmittance of at least 12%. The amount of the ultraviolet absorber to be used will be based on the weight of resin. The U.V. absorber protects the resin and the other absorbers from deterioration by ultraviolet radiation. We prefer to use an amount of U.V. absorber in the range from about 0.2 to about 0.4 parts by weight per 100 parts by weight of the selected resin. The effective amount of each of the other absorbers in the transparent resin of the shield will depend on the thickness of the shield. For the other absorbers, a thicker shield will require less weight of each absorber per unit weight of resin to achieve the desired optical density at the laser specific wavelengths covered by each absorber. For a balanced measure of optical density at most of the laser specific wavelengths to be occluded by the combination of absorbers according to the invention, we prefer to use the absorbers in a weight proportion of one part of the vanadyl phthalocyanine sulfonamide to five to seven parts of the tris dialkylaminophenyl aminium salt to 10 to 13 parts of the perinone absorber.

The invention can be better understood by reference to more detailed specific examples embodying the presently most preferred mode for carrying out the invention.

EXAMPLE 1

A laser protective visor is made by combining a mixture of the absorbers listed in Table 1 in the proportions shown, melt blending the mixed absorbers in a thermoplastic bisphenol-A polycarbonate resin having melt flow index of 16, and molding a visor by injection molding of the melt blend. Thickness of the molded visor is 80 mils (2 mm). The amount of each absorber per 100 parts by weight of the resin used in the blend are shown in Table 1.

EXAMPLE 2

Laser protective lenses are made by the method described in Example 1 except the amounts of the absorbers used are those shown in Table 1, and the thickness of the injection molded lenses is 120 mils (3 mm).

TABLE 1

| ABSORBER | EX 1 pbw | EX 2 pbw |
| --- | --- | --- |
| Tris (p-dibutylamino phenyl) aminium hexafluoroantimonate | 0.12 | 0.1 |
| Vanadyl phthalocyanine-dibutyl sulfonamide | 0.022 | 0.015 |
| Solvent Orange 60 | 0.25 | 0.19 |
| 2,2'-dihydroxy-4-methoxy benzophenone | 0.25 | 0.25 |

At the concentrations of absorbers described in Examples 1 and 2, the molded visors and lenses have optical density at laser specific wavelengths, as set forth in Table 2, below.

TABLE 2

| Laser Type | Wavelength (nm) | Optical Density |
| --- | --- | --- |
| Argon Ion | 488 | 5 |
| Copper Vapor | 511 | 4.8 |
| Argon Ion | 514.5 | 4.5 |
| Nd glass (doubled frequency) | 530 | 4 |
| Nd YAG (doubled frequency) | 532 | 4 |
| Ruby | 694.3 | 3.6 |
| Alexandrite | 755 | 2 |
| Nd glass | 1060 | 4 |
| Nd YAG | 1064 | 4 |
| The Luminous Transmittance is 12–25%. | | |

To demonstrate stability in use, samples prepared as in Examples 1 and 2 were exposed to Xenon WOM accelerated exposure testing. After 1200 hours continuous exposure, the samples showed no loss of optical density at the laser specific wavelengths and no loss of luminous transmittance. By comparison, a sample prepared with the dye combination described in U.S. Pat. No. 4,622,174, mentioned above, lost 53% of its protective strength at the 532 nm line only after 4.6 hours exposure in the same test.

What is claimed is:

1. A radiation shield comprising a transparent polymeric resin having dispersed therein:
   (1) A vanadyl phthalocyanine sulfonamide,
   (2) an ultraviolet absorber having broad band absorption in the ultraviolet band,
   (3) an absorber selected from Solvent Orange 60 and the dialkylsulfonamide derivatives of 12-H-naphthoperinone; and
   (4) an absorber selected from tris(p-diethylaminophenyl)aminium hexafluoroantimonate; tris(p-diethylaminophenyl)aminium hexafluoroarsenate; tris(p-dibutylaminophenyl)aminium hexafluoroantimonate; and tris(p-dibutylaminophenyl hexafluoroarsenate.

2. A radiation shield of claim 1 wherein the resin is a polycarbonate having a melt flow index of at least 16.

3. A radiation shield of claim 1 having optical density of at least 2 at each of the laser specific wavelengths of 488 nm, 511 nm, 514.5 nm, 530 nm, 532 nm, 694.3 nm, 755 nm, 1060 nm, and 1064 nm, and having at least 12% luminous transmittance.

4. A radiation shield of claim 3 wherein the resin is a polycarbonate and the absorbers are: Vanadyl phthalocyanine dibutyl sulfonamide, 2,2'-dihydroxy-4-methoxy benzophenone Solvent Orange 60, and tris(dibutylaminophenyl)aminium hexafluoroantimonate.

5. A radiation shield of claim 3 wherein the ultraviolet absorber is present in an amount of from 0.2 to 0.4 parts by weight, per 100 parts by weight of resin, and the other absorbers are present in amounts to provide optical density at least 2 at the laser specific wavelengths of 488 nm, 511 nm, 514.5 nm, 530 nm, 532 nm, 694.3 nm, 755 nm, 1060 nm and 1064 nm.

* * * * *